April 7, 1942.                L. GOODALL                2,278,922
                              ROTARY MOWER
                    Filed April 17, 1941          2 Sheets-Sheet 1

Leonard Goodall
INVENTOR
BY Victor J. Evans & Co.
ATTORNEYS

April 7, 1942.                L. GOODALL                2,278,922
ROTARY MOWER
Filed April 17, 1941                2 Sheets—Sheet 2
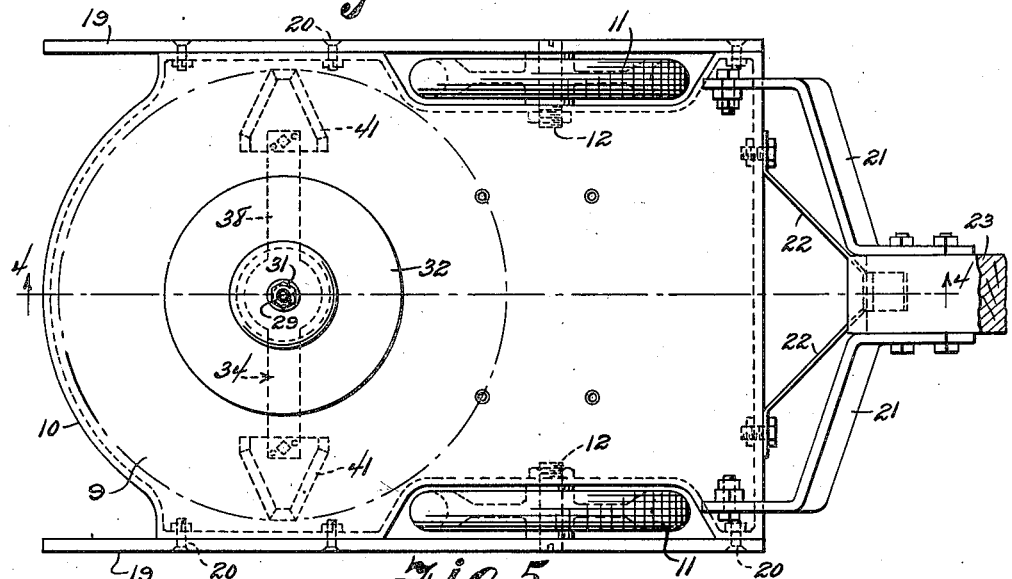
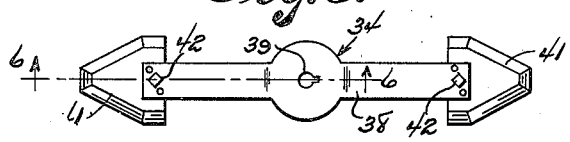
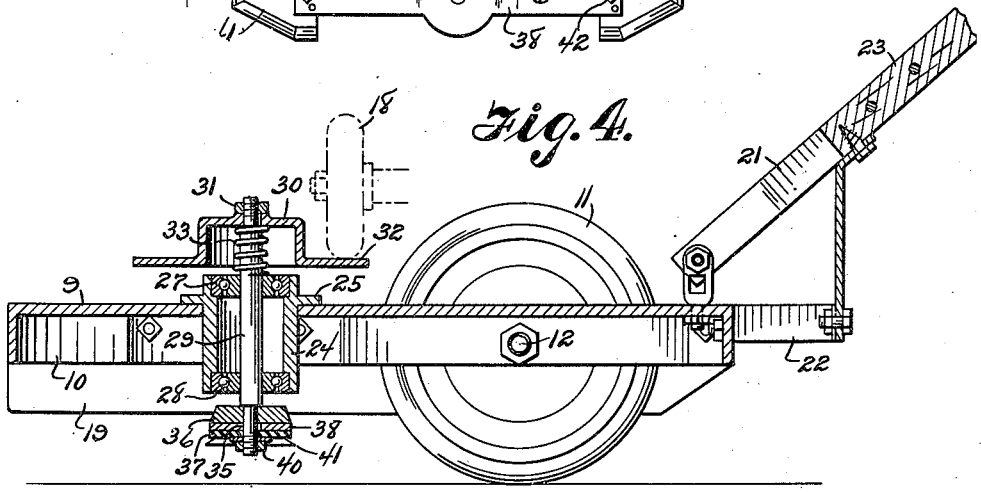
Leonard Goodall
INVENTOR
BY Victor J. Evans & Co.
ATTORNEYS Patented Apr. 7, 1942

2,278,922

UNITED STATES PATENT OFFICE 2,278,922

ROTARY MOWER

Leonard Goodall, Warrensburg, Mo.

Application April 17, 1941, Serial No. 389,085

2 Claims. (Cl. 56—26)

The present invention relates to improvements in rotary mowers adapted for use in cutting or trimming grass growing in places not accessible for reach with the ordinary lawn mower.

The primary object of the invention is to provide a mower of the class described having a novel form of means for driving the rotary cutting blade.

Another object of the invention is to provide a mower having a rotary cutting blade that is especially designed for use in trimming grass growing against the curbings, monuments, trees or other objects, which places are not always conveniently reached using the conventional lawn mower.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevational view of a rotary mower embodying the features of the present invention.

Figure 2 is a front elevational view thereof.

Figure 3 is a top plan view with the driving motor removed.

Figure 4 is a longitudinal sectional view taken substantially on line 4—4 of Figure 3.

Figure 5 is a top plan view of the rotory cutting element removed from the mower.

Figure 6 is a detail sectional view of the rotory cutting element taken substantially on line 6—6 of Figure 5.

Referring to the drawings for a more detailed description thereof, the improved rotary lawn mower is generally designated by the reference numeral 8 and includes a framework comprising a base member 9 formed with downturned flanges 10 on all sides thereof. The mower is portable on rubber-tired wheels 11 which are supported on stub axles 12 extending from opposed sides of the base member 9 and held in the flanges 10. As is readily apparent from the drawings, the wheels 11 extend inwardly from each side of the base member 9 and are therefore inside the line of cutting of the rotary cutting blade to be hereinafter described.

An internal combustion engine generally designated by the reference numeral 13 is bolted or otherwise secured as indicated at 14 to the base member 9 and provides the power for operating the rotary cutting blade. As is to be understood the engine 13 is provided with a fuel supply tank 15 and carburetor 16 all suitably supported from the motor. The motor 13 drives the crankshaft on which is mounted a bearing member 17, said bearing member supporting a rubber-tired wheel 18. Rotation of the crankshaft, not shown, drives the bearing member 17 and its wheel 18.

Members 19 are attached by means of screws or the like 20 to the side flanges 10 to form depending side walls for the frame. Brackets 21 and 22 extend from the rear of the frame and are attached to a handle 23 adapted to be engaged for pushing the mower over the lawn.

Mounted in the forward end of the base member 9 is a cylindrical-shaped housing 24, said housing extending below the member 9 as clearly shown in Figure 4 of the drawings. The upper end of the housing 24 is formed with a flange 25 in engagement with the face of the member 9 through which bolts or similar fastening means 26 extend for retaining the housing in position. The housing 24 supports upper and lower ball bearing races 27 and 28, respectively, through which extend a vertical shaft 29. The shaft 29 projects above the base member 9 and has attached to its upper end a cap 30, said cap being fixedly secured to the shaft by means of the nut 31. The cap 30 is formed with an annular flange 32 adapted to be contacted by the wheel 18, the frictional contact thereof rotating the flange to drive the shaft 29. A compression spring 33 is disposed between the inner face of the cap 30 and the upper bearing 27, said spring adapted to urge the cap upwardly into contactual engagement with the wheel 18.

The shaft 29 drives the cutting element best shown in Figure 5 of the drawings and generally designated by the reference numeral 34. The shaft 29 has its lower end reduced in diameter as indicated at 35 and supported thereon are a pair of washers 36 and 37 which support therebetween the bar 38, said bar being formed with a central opening 39 for engagement over the end of the shaft 29. A lock nut and washer 40 retain the bar 38 in position. The bar 38 supports on each end thereof triangular-shaped cutting blades 41, the same being secured by means of bolts or the like 42. As is to be understood, the bar 38 carrying the blades 41 is fixedly secured to the shaft 29 for rotation therewith, said arm swinging on a radius within the side members 19 and only the side members of the frame remain between the ends of the blades and the grass to be cut. As shown in Figure 3 of the drawings, the side members project beyond the front of the frame and accordingly any grass growing against the object to be trimmed, can be forced inside the members to be acted upon by the rotating cutting blades.

In operation, the internal combustion engine is started for driving the bearing member 17 and its supported wheel 18. As the cap 30 has its flange 32 always in contact with the wheel 18, as the latter rotates, said cap will be caused to rotate to drive the shaft 29 and its bar 38 on which are mounted the cutting blades 41. Contact of the wheel 18 with the flange 32 produces a driving action for the cutting blades that is substantially noiseless with a minimum amount of friction between the bearing elements. Should the tire on the wheel 18 become worn it can be removed and replaced with a minimum amount of time and effort. The mower is easily moved over the surface to be cut on its wheels 11, the same being pushed in the manner of the conventional lawn mower.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and therefore, such changes and modifications may be made therein as do not affect the spirit of the invention nor exceed the scope thereof as expressed in the appended claims.

What is claimed is:

1. In a mower, a wheeled base, a bearing member secured to the base, a vertically extending shaft journaled on the said bearing member, a cap having driving connection with an upwardly projecting end of the shaft, an annular horizontally disposed flange projecting outwardly of the cap, a compression spring yieldingly holding the said cap in elevated position, and a cutter carrying bar detachably secured to the lower end of the shaft and extending transversely thereof.

2. In a mower, a wheeled base plate, a cylindrical housing secured to and extending vertically through the base plate, a pair of bearings mounted in the upper and lower portions of the said housing, a shaft extended through the said bearings and mounted axially of the housing, a bar detachably secured to the lower end of the shaft and extending transversely thereof, a cutter blade fastened to each end of the said bar, a cap having its center fastened to the upper end of the shaft and having an annular depending skirt portion, an annular flange extending horizontally outward of the lower end of the cap skirt for engaging a rotary drive member, and a compression spring sleeved about the upper portion of the shaft between the upper plate of the cap and the top bearing for yieldingly urging the flange to elevated driver engaging position.

LEONARD GOODALL.